(12) United States Patent
Romanov

(10) Patent No.: US 10,237,875 B1
(45) Date of Patent: Mar. 19, 2019

(54) ROUTING-AWARE NETWORK LIMITER

(71) Applicant: Amazon Technologies, Inc., Seattle, WA (US)

(72) Inventor: Anton Romanov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 14/866,219

(22) Filed: Sep. 25, 2015

(51) Int. Cl.
| | |
|---|---|
| *H04L 12/26* | (2006.01) |
| *H04W 72/04* | (2009.01) |
| *H04L 29/12* | (2006.01) |
| *H04L 12/823* | (2013.01) |
| *H04L 29/06* | (2006.01) |
| *H04W 12/12* | (2009.01) |
| *H04L 12/819* | (2013.01) |

(52) U.S. Cl.
CPC ....... *H04W 72/0486* (2013.01); *H04L 47/215* (2013.01); *H04L 47/32* (2013.01); *H04L 61/6068* (2013.01); *H04L 63/1425* (2013.01); *H04W 12/12* (2013.01)

(58) Field of Classification Search
CPC ....... H04L 47/10; H04L 47/20; H04L 47/215; H04L 47/11; H04L 47/32; H04L 47/31; H04L 47/2441; H04L 47/12; H04L 47/125
See application file for complete search history.

(56) References Cited

U.S. PATENT DOCUMENTS

| | | | | |
|---|---|---|---|---|
| 7,586,848 | B1 * | 9/2009 | Gunduzhan | H04L 47/10 370/235 |
| 8,706,902 | B2 * | 4/2014 | Yang | H04L 47/22 709/223 |
| 2007/0280114 | A1 * | 12/2007 | Chao | H04L 43/0888 370/235.1 |
| 2009/0296582 | A1 * | 12/2009 | Shi | H04L 47/10 370/236 |
| 2012/0079592 | A1 * | 3/2012 | Pandrangi | H04L 47/10 726/22 |

* cited by examiner

*Primary Examiner* — Sai Aung
(74) *Attorney, Agent, or Firm* — Thorpe North & Western, LLP.

(57) ABSTRACT

Technology is described for managing network traffic directed to a plurality of destination internet protocol (IP) addresses that are served by a destination host or service. A network action communication for a destination IP address served by the destination host or service may be received. The destination host or service may be overloaded when a number of network action communications directed to the plurality of destination IP addresses served by the destination host or service exceeds a defined threshold. The network action communications may be dropped in order to prevent the destination host or service from receiving a volume of network traffic that exceeds the defined threshold.

18 Claims, 8 Drawing Sheets

US 10,237,875 B1

ROUTING-AWARE NETWORK LIMITER

BACKGROUND

Computing services in computing service environments are often targets for malicious attacks conducted over a computing network. These malicious attacks can potentially cause a targeted computing service system to slow to a point that physical hosts included in the computing service system are unable to respond to legitimate network requests. For example, a DDoS (Distributed Denial of Service) attack may be a type of malicious attack that distributes a DoS (Denial of Service) program among several computing devices that in turn may flood a computing service system with network packets (e.g., SYN (synchronization) packets). The flood of network packets may cause network performance to slow resulting in system paralysis for the computing service system.

In the event of a malicious attack, computing service providers may have a difficult time distinguishing non-malicious network traffic from malicious network traffic. For example, a DDoS attack may involve multiple computing devices sending requests to perform some type of network action to a target computing service. The IP (Internet Protocol) address for the computing devices sending the requests may be changed in an attempt to make the request appear to originate from a legitimate or known client device, thereby making identification of the attacking computing devices problematic.

DETAILED DESCRIPTION

Figure 1:
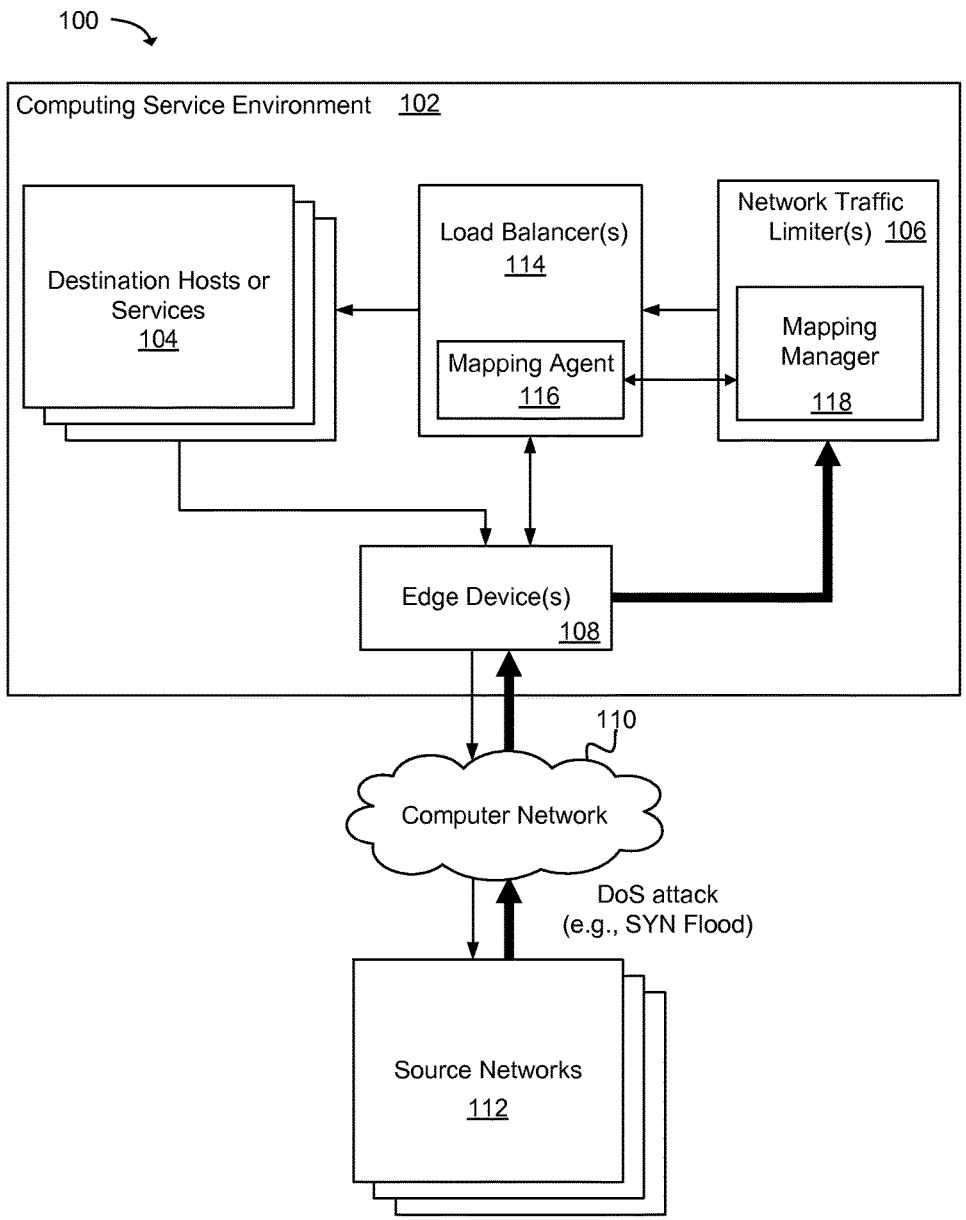
FIG. 1 is a block diagram illustrating an example system for regulating an amount of network traffic sent by source networks to destination hardware hosts.

A technology is described for managing network traffic directed to a group of destination internet protocol (IP) addresses that are served by a destination host or a destination service. There may be, for example, multiple computing instances at a destination host (e.g., a server or a hardware host) and each computing instance may be associated with a corresponding destination IP address (e.g., a public IP address). Alternatively, the group of destination addresses may be served by a destination service or a virtualized server. Traffic may be directed to the destination IP addresses via a transmission control protocol (TCP) connection, though other types of network connections (or requests for connections) may be used. Traffic may also be sent to the destination IP address using a connectionless protocol such as user datagram protocol (UDP). Traffic to the destination IP addresses served by the destination host or destination service may be managed by a networking device, such as a traffic mitigation device, a load balancing device, a denial-of-service (DoS) mitigation device, a security device, or a proxy device. The networking device may use a mapping of IP addresses to destination hosts or services to determine that an amount of traffic directed to the group of destination IP addresses served by the destination host or destination service exceeds a threshold of traffic that may be handled by the destination host or destination service that serves the destination IP addresses and drop or deprioritize packets sent to the destination IP addresses. For example, the destination host or destination service may be overloaded with incoming packets, such as connection requests or other network action communications from a source network or client. Alternatively, the networking device may determine that the destination host or destination service can handle the amount of traffic designated for the destination IP addresses and may forward the traffic packets to the destination IP addresses.

In one configuration, the client may send a network action communication, such as a packet over a packet-switched network to a destination IP address at the host or destination service. A network action communication may be, for example, a synchronize (SYN) packet, a transmission control protocol (TCP) operation, a user datagram protocol (UDP) packet, or another type of network packet containing another network action. If the client is a legitimate client, then the network action communication may, for example, indicate an attempt to establish a connection with the destination host or destination service. The network action communication (e.g., SYN packet) may indicate the client's desire to establish the connection using one of the destination IP addresses hosted by the destination host or destination service. If the client is a malicious client, then the network action communication may be an attempt to overload the destination host or destination service that serves the destination IP addresses. The destination host or destination service may be part of a computing service environment. For example, the destination host or destination service may be included in a content delivery network (CDN) in the computing service environment. The destination host or destination service in the CDN may be capable of delivering streaming media content (e.g., audio or video content), web content, static or dynamic content, etc.

The networking device may be positioned to intercept and inspect the network action communication (e.g., SYN packet) before the network action communication reaches the destination IP addresses hosted on the destination host or destination service. The networking device may act as a front line of defense in order to protect the destination host or destination service from malicious incoming packets designated for the destination IP addresses from malicious clients that may be trying to attack the destination host or destination service. In one example, the networking device may receive the network action communication and determine that the destination host or destination service on the destination network is overloaded with incoming network action communications. The destination network may be a network in which the destination host or destination service is located, and the destination network may be part of a computing service environment. The destination host or destination service may be overloaded when the number of network action communications received by the destination host or destination service (e.g., at destination IP addresses of computing instances on a destination host) exceeds a defined threshold. For example, the destination host may be overloaded with the network action communications during a denial of service (DoS) attack. A more detailed example of a DoS attack is a SYN flood attack, which may occur when an excessive number of SYN request packets are received at destination IP addresses with an intention of overloading the destination IP addresses, which in turn may overload the destination host or destination service that serves the destination IP addresses.

The networking device may also determine that the source network on which the client operates is overloading the destination network with the network action communications. For example, the networking device may determine that the source network may be launching the DDoS attack on the destination network. In one example, the networking device may identify a particular source IP address as being part of the source network using a Bloom limiter.

The networking device may drop additional network action communications sent to the destination IP addresses served by the destination host or destination service for a predefined period of time when the destination host or destination service is overloaded with network action communications and/or the source network is overloading the destination network with the network action communications. As a result, the malicious clients on the source network may be blocked by the networking device. The destination hosts and destination hosts or destination services can therefore avoid wasting computing capacity for a source network that is overloading the destination network. In addition, the networking device may drop network action communications from clients on source networks that are sending the excess number of network action communications to the destination IP addresses on the destination host or destination service.

In one example, the networking device may determine whether the destination host or destination service is overloaded using token buckets at the networking device. For example, the networking device may determine whether a token is obtained from a token bucket associated with the destination host or destination service and with the destination IP addresses served by the destination host or destination service. The token may not be available in the token bucket when the destination host or destination service is overloaded with the network action communications because the tokens may have already been consumed. At this point, the network action communications can be dropped or deprioritized, if desired. Alternatively, if the token is not obtained from the token bucket associated with the destination host or destination service, then the networking device may determine whether a token is provided from a token bucket associated with the source network. If the token bucket associated with the source network also does not have the token, then the networking device may determine that the source network is overloading the destination network with the network action communications. As a result, the networking device may drop or de-prioritize the network action communications sent from the source IP address on the source network. In addition, the networking device may provide the original token back to the token bucket associated with the destination host or destination service when the source network is overloading the destination network in order to preserve a computing capacity at the destination host or destination service. In other words, since computing capacity for processing a network action communication at the destination host or destination service is not actually being used, that SYN capacity may be preserved for processing network action communications from other clients (e.g., clients that are not launching DDoS attacks).

As mentioned above, the present technology allows a networking device to use a mapping of IP addresses to destination hosts or destination services. By using a mapping in this way, the networking device is able to regulate network traffic in a way that is better suited to the physical capabilities of hardware or individual destination hosts, which are hosting multiple mapped IP addresses in computing service environment. Without such a mapping between IP addresses to destination hosts or services, a scheme in which token buckets are associated with destination IP addresses (rather than destination hosts or services) may be used. However, since the networking device would not be informed of which IP addresses map to which hosts or services, a destination host or destination service that serves many destination IP addresses could still be overloaded even though none of the token buckets for the destination IP addresses is empty. Furthermore, a destination host or service that serves a single destination IP address might be capable of handling more traffic (i.e., underloaded) even though the token bucket for the single IP address is empty. By contrast, the use of a mapping in current technology allows token buckets to be created for the actual hosts or services serving the IP addresses so that hosts or services can avoid being overloaded or underloaded.

FIG. 1 is a block diagram illustrating an example of a system 100 for regulating an amount of network traffic originating from a plurality of source networks 112 that is sent to destination hosts or services 104. The system 100 may include a computing service environment 102 containing a number of virtualized computing services and hardware substrate components for supporting the virtualization services that may be in communication with a plurality of source clients. The source networks 112 may include multiple source clients requesting to perform network actions with (e.g., connect to) destination hardware, hosts, or services 104 contained within the computing service environment 102. The destination hosts may be hardware hosts, server hosts, or other hosts which serve groups of destination IP addresses. The destination services may be virtualized services, distributed application or other service that serve grouping of destination IP addresses.

As illustrated, the computing service environment 102 may include one or more edge devices 108, network traffic limiter(s) 106, load balancer(s) 114, and a number of destination hosts or services 104. A load balancer 114 may be a hardware device or an application on a hardware device (e.g., a server) and may include a mapping agent 116 (e.g., implemented as a method in the load balancer 114) that is in communication with the edge device(s) 108. The mapping agent may receive information from the edge device(s) 108 (or from another source in a control plane of the computing service environment 102) indicating which groups of destination IP addresses are served by specific destination hardware, hosts, or services 104. The network traffic limiter 106 may be a hardware device or an application on a hardware device (e.g., a server) configured to regulate an amount of network traffic that reaches an intended destination host or service 104 originating from one or more source networks 112 using a rate limiter such as a Bloom limiter. A detailed discussion of a Bloom limiter is provided in U.S. patent application Ser. No. 14/582,054, filed Dec. 23, 2014, the entire specification of which is hereby incorporated by reference in its entirety for all purposes. The network traffic limiter 106 may include a mapping manager 118 that is in communication with the mapping agent 116. The mapping manager 118 may receive information from the mapping agent 116 indicating which of the destination hosts or services 104 serves one or more destination IP addresses. The mapping manager 118 may use the information received from the mapping agent 116 to create or update an IP-address-to-host mapping that indicates which of the destination hosts or services 104 serves a plurality of destination IP addresses.

Multiple destination IP addresses may be hosted to a single destination host or service. For example, if multiple computing instances are running on a single hardware host, each computing instance may have a corresponding IP address and each of the corresponding IP addresses may map to the single hardware host.

As one specific example where a network traffic limiter 106 may be used to regulate an amount of network traffic intended for one of the destination hosts or services 104, a type of DoS (Denial of Service) attack called a SYN flood may be mitigated using rate limiters that may be included in a network traffic limiter 106. In the event of a SYN flood, a succession of SYN requests are sent to IP addresses of computing instances located on one or more destination hosts or services 104 in an attempt to consume enough of the destination hosts' or services' resources as to make one or more of the destination hosts or services 104 unresponsive to useful network traffic. A SYN request is part of a TCP protocol where a source client included in a source network 112 sends a SYN (synchronize) message to a destination IP address served by one of the destination hosts or services 104. The computing instance associated with a destination IP address on the destination host or services 104 that receives the SYN message may then send a SYN-ACK (synchronize acknowledge) message back to the source client, whereupon the source client responds with an ACK (acknowledge) message.

In the event of a SYN flood, one or more source clients included in a source network 112 will not respond to the computing instances or other networking services on the destination hosts or services 104 with an expected ACK message. As a result, the one of the computing instances with an IP address on the destination hosts or services 104 may wait for the ACK message for a period of time resulting in a half-open connection that binds computing resources used to create the half-open connection. The above process may be repeated for each SYN request received that is not acknowledged by a source client until an amount of computing resources may be consumed that causes the destination host(s) or service(s) 104 to be unable to respond to non-malicious network traffic.

The network traffic limiter 106 may be able to mitigate the effects of a SYN flood by providing a rate limiter for each source network 112 that makes SYN requests to IP addresses on the destination hosts or services 104 within the computing service environment 102. The rate limiter may allow up to a certain number of SYN requests and other communications (e.g., packets and other network action communications) to be transmitted to the destination hosts or services 104 within a defined time period. Any SYN requests or other network action communications beyond the certain number of communications allowed may be dropped by the network traffic limiter 106.

One specific example of a method used by a network traffic limiter 106 to mitigate a malicious network attack may include receiving a network packet sent through a computer network 110 (e.g., the Internet) from a source network 112. A request for a token granting permission to transmit the network packet to one of the destination hosts or services 104 may be made by identifying rate limiters for the source network 112 and determining whether any of the rate limiters have an available token that can be distributed in response to the request for the token. In the case that the rate limiters do not have an available token and a defined time period has not expired allowing for additional tokens to be added to the rate limiter, the network packet may be dropped, thereby mitigating the network attack by preventing the network packet from reaching an intended destination host in the destination hosts or services 104.

In an alternative configuration of the technology, the fact that no additional tokens are available may become an attribute of a packet that contributes to a priority of the packet rather than becoming a single criterion that is used to decide whether a packet is immediately dropped or allowed. For example, network packets may be prioritized such that network packets suspected of being associated with a network attack or a potential network attack may be assigned a lower priority than network packets that are not suspected of being associated with the network attack. In one more specific configuration, the header of a network packet may be analyzed to identify packet attributes that have suspicious values.

Various packet attributes may be selected and the values of the packet attributes may be evaluated to determine whether the values indicate that the network packet may be associated with a potential computer network attack. For example, a packet attribute value may be suspicious when a value in a packet header is a value that is atypical, unexpected, or suspect (e.g., due to an association with a suspicious host or due to an incorrect configuration by an attacker). Similarly, the fact that no more tokens are available for a destination host or service 104 may be treated as indicating that a packet or packets are more likely to be sent from an attacker.

The various packet attributes selected for analysis may be assigned a suspicion weight. A suspicion weight may be weighted according to the suspiciousness of a packet attribute value. For example, a rarely occurring packet attribute value may be weighted more heavily than a more commonly occurring packet attribute value. In the case where a token bucket for a destination host or service 104 does not have a token, this lack of a token may be a heavily weighted attribute for a packet that is considered in combination with other packet attributes. The suspicion weights assigned to the packet attributes may then be used to calculate a suspicion score for the network packet, and the suspicion score may then be used to deprioritize suspicious network packets (or conversely prioritize non-suspicious network packets) as a result of network bandwidth capacity being limited or overloaded.

As a result, multiple packet attributes for a network packet may be analyzed and suspicion weights associated with the packet attributes and values analyzed may be used to calculate a suspicion score for the network packet in the present technology. The suspicion score may be used to deprioritize suspicious network packets (or prioritize likely legitimate or non-malicious network packets) during times that network bandwidth may be overloaded. As such, legitimate network packets may be less likely to be identified as suspicious and dropped when computer network bandwidth is limited. A detailed discussion the creation and use of suspicion scores is provided in U.S. patent application Ser. No. 14/668,432, filed Mar. 25, 2015, the entire specification of which is hereby incorporated by reference in its entirety for all purposes.

In one example, two network packets intended for destination IP addresses of a destination host or service may arrive at once at the network device. One of the network packets may have a suspicion score of 0 and the other network packet may have a suspicion score of 100. If only one token remains in the token bucket that is associated with the destination host or service, then the network device can use the remaining token for the network packet with the lower suspicion score of 0 and drop the network packet with the higher suspicion score of 100. In this fashion, incoming packets with lower suspicion scores may be given higher priority.

Figure 2:
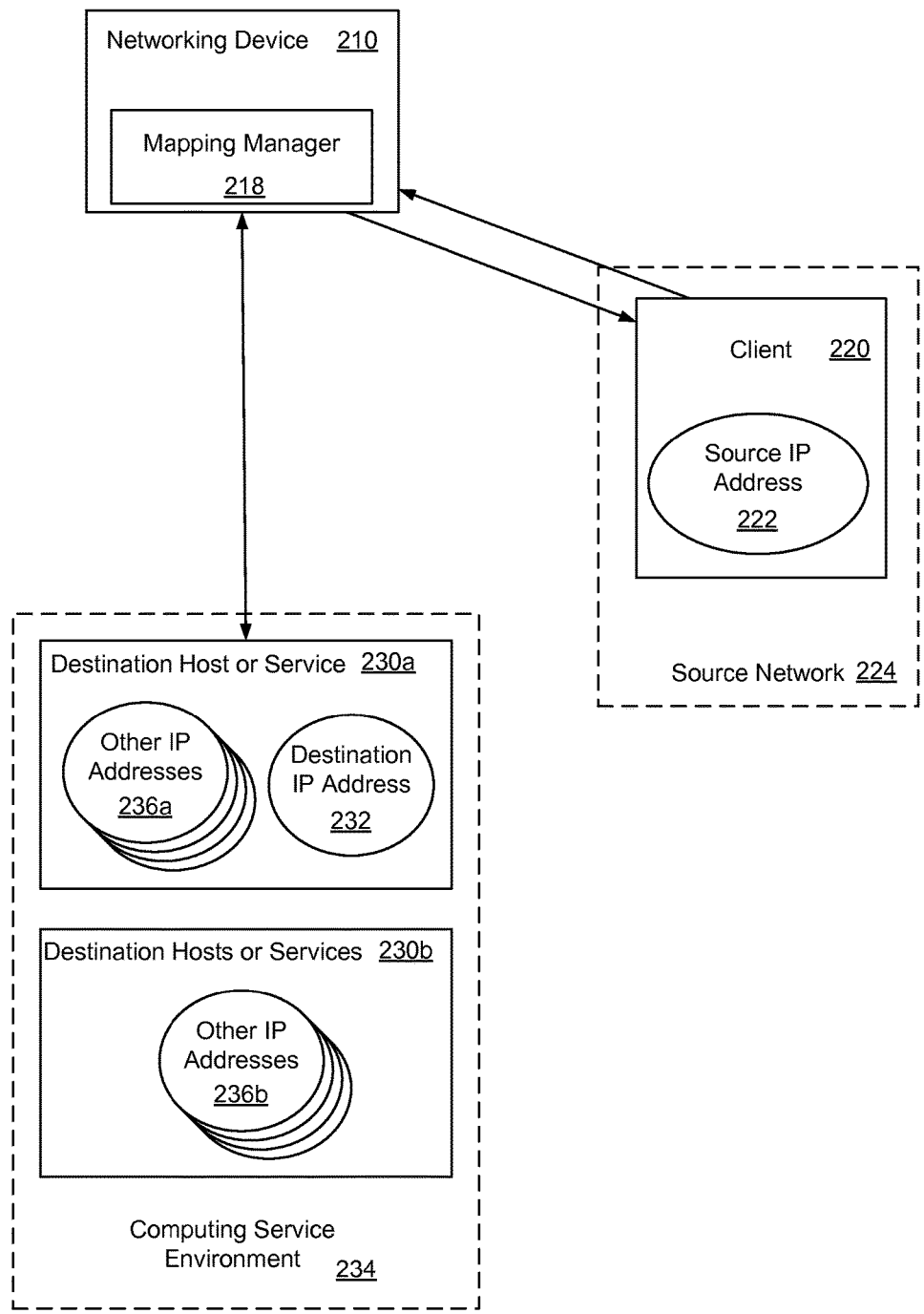
FIG. 2 illustrates a system and related operations for managing connection attacks in accordance with an example.

FIG. 2 illustrates an example system and related operations for managing network traffic between a client 220 and a destination host or service 230a via a networking device 210. The destination host or service 230a may be included in a computing service environment 234. The computing service environment 234 may also include other destination hosts or services 230b. The networking device 210 may be a denial-of-service (DoS) mitigation device that manages network traffic between the client 220 and the destination host or service 230a. The networking device 210 may also include a mapping manager 218 that includes an IP-address-to-host relationship mapping table for tracking IP addresses that are hosted by the destination host or service 230a. For example, one or more (e.g., one up to hundreds) computing instances may be hosted on the destination host or service 230a and each computing instance may have a public IP address. Other types of virtualized devices or applications with IP addresses may be hosted on the destination host or service 230a.

The client 220 may be included in a source network 224. In one configuration, the client 220 may send a packet that is routed through the networking device 210. The client 220 may send the packet using a source internet protocol (IP) address 222 associated with the source network 224. The packet may be intended for a destination IP address 232 of the destination host or service 230a. The networking device 210 may be notified that the destination IP address 232 is served by the destination host or service 230a because of a mapping of the IP-address-to-host relationship mapping table included in the mapping manager 218. The IP-address-to-host relationship mapping table may also include mappings indicating that the other IP addresses 236a map to the destination host or service 230a and that the other IP addresses 236b map to the other hosts or services 230b.

The networking device 210 may receive the packet and determine that the destination host or service 230a is overloaded with network traffic. The destination host or service 230a may be overloaded with network traffic directed to the destination IP address 232 and/or the other IP addresses 236a. The networking device 210 may further determine whether the source network 224 containing the source IP address 222 is overloading the computing service environment 234 or the destination network with packets. If the source network 224 is sending a number of packets that exceeds a threshold, for example as measured by tokens in a token bucket associated with the source network 224, connection requests sent through the client 220 to the networking device 210 may be blocked (e.g., dropped or reset) for a defined time period.

In some example configurations, there may also be a token bucket associated with each of the destination hosts or services 230a, 230b. If IP addresses served by a respective destination host or service are receiving a number of packets that exceeds a threshold as measured by tokens in the respective token bucket associated with the respective host or service, some or all packets sent to the IP addresses may be blocked until the tokens are refreshed after a defined time period.

While the discussion of this technology provides examples in which IP addresses are used, other addressing schemes may be used. For example, other private addressing schemes, public addressing schemes, addressing schemes, or translated addresses could be used with this technology. Further, this technology may be used with other networking protocols besides TCP/IP (e.g., Netbeui, NetBIOS, or other networking protocols). This technology may be applied to any type of packet sent through a network (e.g., packets sent using TCP or packets sent using connectionless protocols such as UDP).

Figure 3:
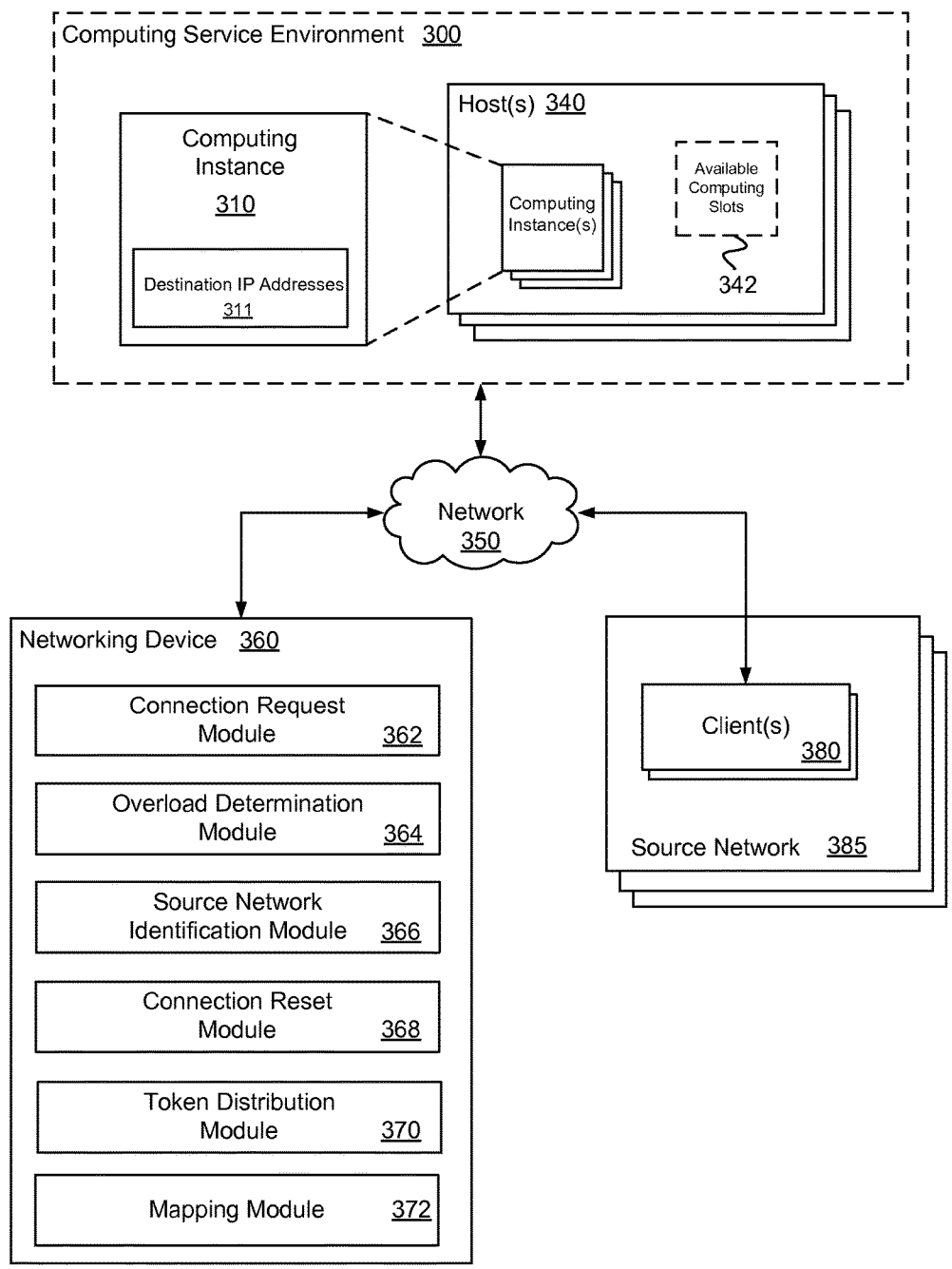
FIG. 3 is a block diagram that illustrates various components included in a system for managing connection attacks in accordance with an example.

FIG. 3 illustrates components of an example computing service environment 300 according to one example of the present technology. The computing service environment 300 may include a computing instance 310 associated with a destination IP address 311. The computing instance 310 may be hosted or located at a host 340. The computing instance 310 may be in communication with a networking device 360 and a client 380 via a network 350. The networking device 360 may include a denial-of-service (DoS) mitigation device, a mitigation device, a security device, or a proxy device. The networking device 360 may contain a number of modules for managing network traffic between the computing instance 310 and the client 380. In addition, the computing service environment 300 may include a host 340 executing a plurality of computing instances. In one example, the computing instance 310 may be executed on the host 340 using a hypervisor. The computing instance 310 may communicate using a virtual network that is an overlay on an actual computing service network.

The host 340 may have available computing slots 342 (e.g., idle computing resources) that may be used to execute a computing instance. The available computing slots 342 may be allocated to customers who may then utilize an available computing slot 342 to execute a computing instance.

The networking device 360 may include a connection request module 362, an overload determination module 364, a source network identification module 366, a connection reset module 368, a token distribution module 370, a mapping module 372, and other functions, applications, services, processes, systems, engines, or functionality not discussed in detail herein. The connection request module 362 may be configured to receive connection requests from a client 380 for establishing a connection between the client 380 and the computing instance 310 using the destination IP address 311. In one example, the connection request module 362 may receive the connection requests (e.g., SYN packets) from the client 380 on a source network 385. The client 380 may send the connection requests in order to establish a transmission control protocol (TCP) connection with the computing instance 310. The destination IP address 311 may be an IP address associated with the computing instance 310, and the destination IP address 311 may be used to establish the connection between the client 380 and the computing instance 310.

The overload determination module 364 may be configured to determine that the host 340 is being overloaded when an amount of traffic being sent to the IP addresses served by computing instances on the host 340 (e.g., to the destination IP address 311) exceeds a defined threshold. The traffic may include connection requests. In one example, the overload determination module 364 may determine that the amount of traffic being received at the IP addresses of computing instances associated with the host 340 exceeds the defined threshold and therefore constitutes a DoS attack. In addition, the host 340 may be overloaded when operating at or above a predefined capacity (e.g., 80% capacity level).

The source network identification module 366 may be configured to detect that a source network 385 (on which the client operates) is overloading the service computing environment 300 or destination network with the network traffic. For example, the source network identification module 366 may detect that the source network 385 containing the client 380 with the source IP address is sending an excess number of connection requests to the service computing environment 300 with the host 340, the computing instance 310, and the destination IP address 311. In one example, the source network identification module 366 may use a Bloom limiter when identifying the source network 385 that is overloading the host 340 with the connection requests. The Bloom limiter may use Bloom filter style hashing (e.g., multiple hash functions that map to multiple token buckets for a source network) to identify a plurality of token buckets associated with the source network 385 based on the IP address of the client in the source network 385. These token buckets may be used to track an amount of traffic coming from a source network in a pre-defined time period. When a packet is received from a source network 385, a token is removed from a token bucket for the source network 385. When the token buckets for a source network are empty, then SYN packets being received from the source network 385 may be dropped or a reset message may be sent to the client 380. When the buckets for a source network are empty, the system may check to see if a time period has passed since a recorded time that the bucket (or buckets) was last refilled. If one time period has passed, the token buckets may be refilled with one time period's amount of tokens (e.g., 25 tokens). If multiple time periods have passed, the token buckets may be refilled with multiple time periods' amounts of tokens (e.g., 3 periods have passed so 75 tokens are loaded). A time period may be measured in milliseconds, microseconds, seconds, or another time period. A similar token bucket and refill arrangement may also be used for the hosts 340 as discussed more later.

The connection reset module 368 may be configured to send a connection reset message to the client 380 on the source network 385. For example, the connection reset module 368 may send the connection reset message to the client 380 when the host 340 is overloaded with network traffic and the source network 385 (or the client 380) is detected as overloading the destination network with the connection requests. The client 380 may receive the connection reset message and may be restricted from sending an additional connection request to the computing instance 310 or any other computing instances of the host 340 for a predefined period of time. Alternatively, a connection packet may be forwarded to the computing instance 310 for establishing the connection with the client 380 on the source network 385 when the host 340 is not overloaded with network traffic.

The token distribution module 370 may be configured to provide tokens from a token bucket associated with the host 340 when the host 340 is not overloaded with network traffic from the source network 385. A token may be provided from the token bucket associated with the host 340, for example, when a packet such as a TCP connection request (or another network action communication) is sent to any IP address served by the host 340. Thus, while a token may be provided for a TCP connection request for the destination IP address 311, a token may be provided from the token bucket associated with the host 340 when a packet (e.g., a TCP connection request) is also sent to some other IP address served by the host 340. Hence, tokens in the bucket associated with the host 340 may be depleted as a result of network action communications that are directed to multiple different IP addresses for computing instances or other virtualized computing resources hosted on the host 340. When an incoming network action communication (e.g., a TCP connection request or another type of packet) is received at the networking device 360, the mapping module 372 may be used to identify that the host 340 serves the destination IP address 311 to which the network action communication is directed so that the appropriate token bucket for the host 340 may be identified and used to provide a token. Alternatively, no token may be provided from the token bucket associated with the host 340 when the host 340 is overloaded with network traffic from the source network 285 and the tokens have already been distributed for the predetermined time period.

In an additional example, the token distribution module 370 may provide a token from a token bucket associated with the source network 385 when the source network 385 is not sending an excess amount of traffic to the networking device 360. Alternatively, no token may be provided (or available) from the token bucket associated with the source network 385 when the source network 385 is sending an excess amount of network traffic to the networking device 360. In one configuration, the token distribution module 370 may provide a token back to the token bucket associated with the host 340 of a destination IP address 311 when the source network 385 is sending an excess amount of network traffic to the networking device 360 in order to preserve a computing capacity of the computing instance 310 and the host 340. There may also be multiple source networks 385 that are represented by multiple token buckets in order to represent the many source networks from which traffic may be received via the internet.

In some examples, the client 380 may be utilized by a user to request setup of a TCP connection with the computing instance 310. The client 380 may communicate a SYN packet in order to request setup of the TCP connection. The client 380 may communicate with the computing instance 310 directly upon completion of the TCP connection. The client 380 may include any device capable of sending and receiving data (e.g., packets) over the network 350. The client 380 may comprise, for example a processor-based system such as a computing device. The client 380 may be a device such as, but not limited to, a desktop computer, laptop or notebook computer, tablet computer, mainframe computer system, handheld computer, workstation, network computer, or other devices with like capability.

The various processes and/or other functionality contained within the computing service environment 300 may be executed on one or more processors that are in communication with one or more memory modules. The computing service environment 300 may include a number of computing devices that are arranged, for example, in one or more server banks or computer banks or other arrangements. The computing devices may support a computing service environment 300 using hypervisors, virtual machine monitors (VMMs), and other virtualization software.

The network 350 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
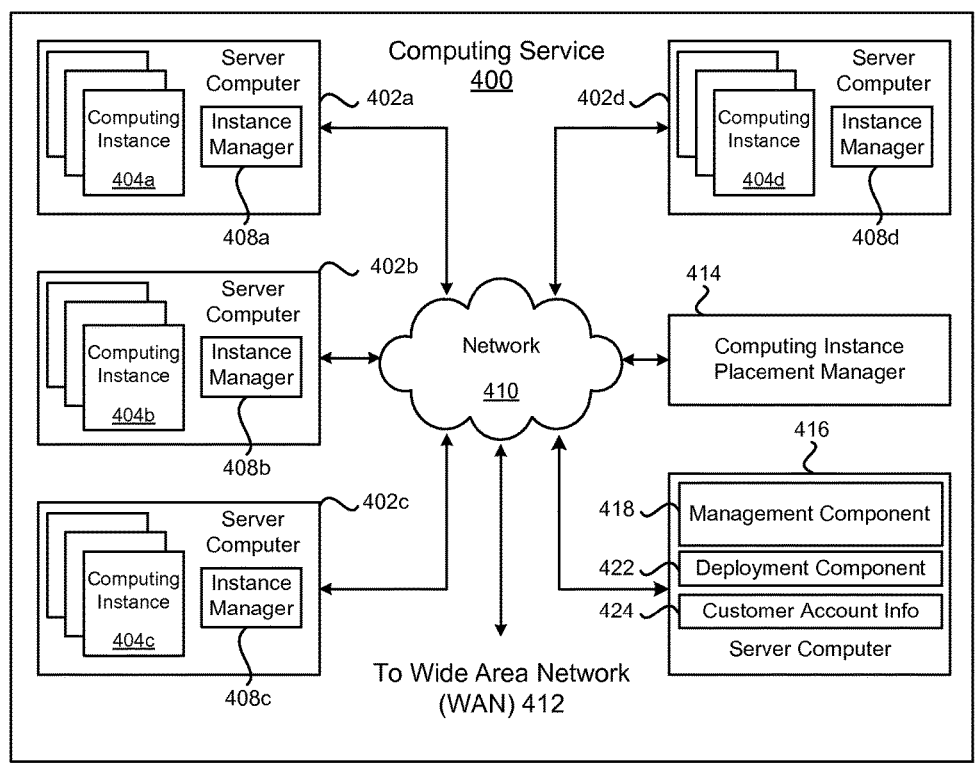
FIG. 4 is a block diagram of a computing service environment in accordance with an example.

FIG. 4 is a block diagram illustrating an example computing service 400 that may be used to execute and manage a number of computing instances 404a-d. The computing instances 404a-d may include the destination host described above. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running browsers or other lightweight client applications, for example. Those familiar with the art will recognize that the computing service 400 may be described as a "cloud" environment.

The particularly illustrated computing service 400 may include a plurality of server computers 402a-d. The server computers 402a-d may also be known as physical hosts. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a computing instance placement manager that may perform functions, such as querying the server computers 402a-d for available computing slots and computing group state information, as well as determining a placement of a computing instance 404a-d in an available computing slot. In addition, the server computer 414 may include functionality of the destination host 210.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end customers may access the computing service 400. The network topology illustrated in FIG. 4 has been simplified, as many more networks and networking devices may be utilized to interconnect the various computing systems disclosed herein.

Figure 5:
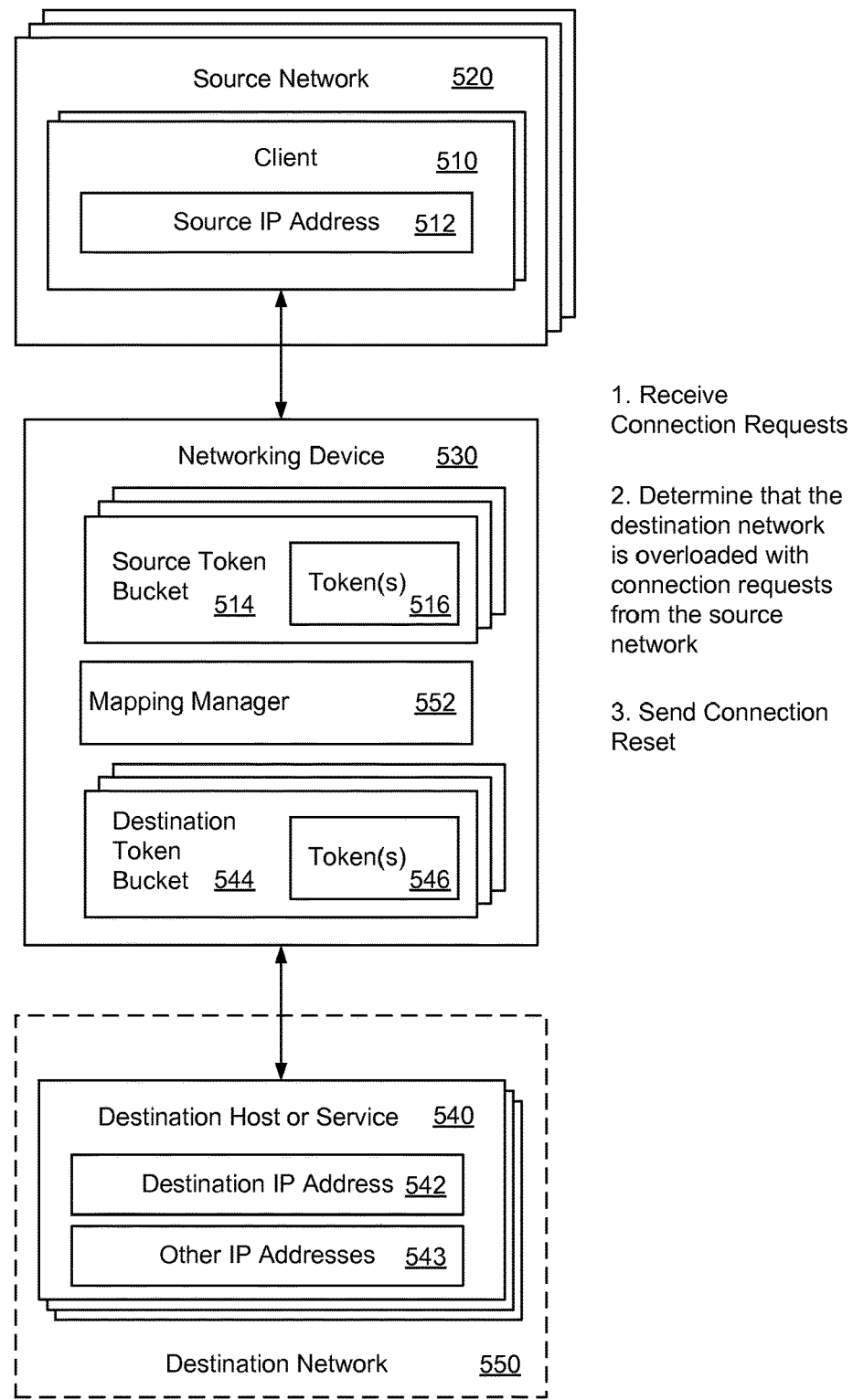
FIG. 5 illustrates a system and related operations for managing connections between a client and a destination host via a networking device in accordance with an example.

FIG. 5 illustrates an exemplary system and related operations for managing network traffic between a client 510 and a destination host or service 540 via a networking device 530. The network traffic may be transferred using a transmission control protocol (TCP) connection, using a connectionless protocol such as user datagram protocol (UDP) or using another networking protocol. The client 510 may also be referred to as a customer, a browser, etc. The client 510 may be on a source network 520. The networking device 530 may include a mitigation device, a denial-of-service (DoS) mitigation device, a security device or a proxy device. In one example, the networking device 530 may be positioned to intercept and inspect packets (e.g., SYN packets) before the packets reach the destination host or service 540. The networking device 530 may act as a front line of defense in order to protect the destination host or service 540 from malicious incoming packets that may be trying to attack the destination host or service 540. The destination host or service 540 may be part of a destination network 550. For example, the destination host or service 540 may be included in a content delivery network (CDN). The destination host or service 540 in the CDN may be capable of delivering streaming media content (e.g., audio or video content), books, web content, static or dynamic content, etc. to the client 510.

In one configuration, the client 510 may attempt to establish a connection to the destination host or service 540. The client 510 may send a connection request (e.g., a SYN packet) for setting up the connection. The connection request may be intercepted by the networking device 530. The connection request may attempt to establish the connection using a destination internet protocol (IP) address 542 associated with the destination host or service 540. The destination IP address 542 may be part of a group of destination IP addresses that are associated with the destination host or service 540 on a destination network 550. A mapping manager 552 may provide information indicating that the destination IP address 542 and the other IP addresses 543 map to the destination host or service 540. The networking device 530 may receive the connection request, and in one example, may determine that the destination IP address 542 is available to be used for establishing the connection with the client 510. In this example, the networking device 530 may forward a connection packet to the destination host or service 540 to enable a connection setup between the client 510 and the destination host or service 540.

In an alternative example, the networking device 530 may detect that the destination host or service 540 is overloaded with connection requests, e.g., when the number of SYN packets (or connection requests) sent to the destination IP address 542 and/or to other IP addresses 543 associated with the destination host or service 540 exceeds a defined threshold. The destination host or service 540 may be overloaded with the connection requests during a denial of service (DoS) attack, such as a SYN flood attack. During the SYN flood attack, an excess number of connection requests may be sent to the destination IP address 542 or to the other IP addresses 543 in order to overload the destination host or service 540. In addition, the destination IP host 540 may be overloaded when the destination host or service 540 is operating at a defined capacity (e.g., 90% of capacity).

The networking device 530 may identify a source IP address 512 associated with the source network 520 that is overloading the destination host or service 540 with the connection requests. In other words, the networking device 530 may determine that the source network 520 on which the client 510 operates is launching the SYN flood attack on the destination IP address 542. In one example, the networking device 530 may identify the source network 520 of the source IP address 512 using a Bloom limiter.

The networking device 530 may send a connection reset message to the client 510 on the source network 520 upon determining that the source network 520 is overloading the destination network 550 with the connection requests. As a result, the client 510 may be restricted by the networking device 530 from sending an additional connection request to the destination IP address 542 or to any other IP addresses on the destination network 550 for a predefined period of time. In addition, the source network 520 that is sending the excess number of connection requests may be sent connection resets before other source networks (that are attempting to establish a connection, but are not sending an excess number of connection requests) are sent the connection resets. Since source networks that are launching the SYN flood attacks may be sent the connection resets, these source networks may not consume a computing capacity at the destination host or service 540. Rather, this computing capacity may be preserved for other clients (and source networks) that are attempting legitimate connections with the destination host or service 540.

In one configuration, the networking device 530 may determine whether the destination host or service 540 is overloaded and whether the source network 520 is overloading the destination network 550 by using multiple token buckets (e.g., one token bucket for each destination host or service 540 and one bucket for each source network 520). For example, the networking device 530 may include a destination token bucket 544 that is associated with the destination host or service 540, as well as a source token bucket 514 that is associated with the source network 520. At least one token bucket (e.g., in a data structure) may have a capacity to store a defined number of tokens that may be distributed in response to a request to perform a network action (e.g., a request to establish a network connection with a destination host). A predetermined number of tokens may be added to the token bucket for each time unit that has expired (e.g., 10,000 tokens) and the token capacity of the token bucket may be, as a non-limiting example, 100,000 tokens.

In one example, upon receiving the connection request from the client 510, the networking device 530 may determine whether a token 546 (e.g., counter value, a unique token or encrypted token) is obtained from the destination token bucket 544. No token 546 may be obtained from the destination token bucket 544 when the destination host or service 540 is overloaded with the connection requests (or SYN requests). Alternatively, obtaining the token 546 from the destination token bucket 544 may indicate that the destination host or service 540 is not overloaded with connection requests. To reiterate, the destination token bucket 544 may have tokens 546 when the destination host or service 540 has available computing capacity and the destination token bucket 544 may not have tokens 546 when the destination host or service 540 does not have expected computing capacity. In one example, a number of SYN packets being received at the networking device 530 may be monitored, and based on the number of SYN packets previously received in a time period, the destination token bucket 544 may obtain or not provide the token 546 (i.e., corresponding to the destination host or service 540 being not overloaded or overloaded, respectively).

If the destination token bucket 544 does not have the token 546 (i.e., indicating that the destination host or service 540 in the destination network 550 is overloaded), then the networking device 530 may determine whether a token 516 is provided from the source token bucket 514. If the token 516 is provided from the source token bucket 514, then the networking device 530 may determine that the source network 520 is not overloading the destination network 550 with the connection requests. However, if the source token bucket 514 does not have the token 516, then the networking device 530 may determine that the source network 520 is overloading the destination network 550 with the connection requests (i.e., the source network 520 is sending an excess number of SYN requests to the destination network 550). In this case, the networking device 530 may restrict or block the connection requests from the identified source network 520 to the destination network and destination host or service 540.

The networking device 530 may also send the connection reset to the client 510 on source network 520 when neither the source token bucket 514 nor the destination token bucket 544 includes the tokens. The connection reset may restrict the source network 520 from reaching the destination network when the source network 520 may send additional connection requests for a defined period of time. In addition, the networking device 530 may provide a dispensed token back to the destination token bucket 542 when the source network 520 is overloading the destination network 550 in order to preserve a computing capacity at the destination host or service 540. In other words, since computing capacity for processing a SYN request at the destination host or service 540 is not actually being used for the excess number of connection requests, that SYN capacity may be preserved at the destination host or service 540 for establishing connections with legitimate clients (e.g., clients on non-attacking source networks).

In one example, the networking device 530 may determine that the destination host or service 540 has received a number of connection requests from a particular source network 520 that has previously launched SYN flood attacks on the destination host or service 540. For example, this particular source network 520 may have launched a SYN flood attack a month ago. This particular source network 520 may be included on a list of potentially malicious source networks. In this example, the networking device 520 may automatically send the connection reset when the number of connection requests reaches a defined threshold. Since this particular source network 520 has acted poorly in the past, this defined threshold may be lower than a threshold used for other source networks.

In one configuration, the client 510 on the source network 520 may send a connection request for establishing the connection using the destination IP address 542. The networking device 530 may detect that the destination host or service 540 is overloaded with connection requests to the destination IP address 542 and/or the other IP addresses 543 on the destination host or service. However, the networking device 530 may determine that this particular source network 520 is not overloading the destination network 550 (i.e., the destination network 550 is actually being overloaded by other source networks). In this case, the networking device 530 may respond to the client 510 with a connection reset, thereby enabling the client 510 to immediately try establishing the connection with an alternative host or service.

While FIG. 5 recites an example in which connection requests are used to launch an attack on the destination host or service 540, this technology can also be used to manage attacks in which other types of network traffic are used. For example, if the source token bucket 514 or the destination token bucket 546 has no tokens, packets received via another protocol, such as UDP, may be blocked by the networking device 530 in order to preserve a computing capacity at the destination host or service 540.

Figure 6:
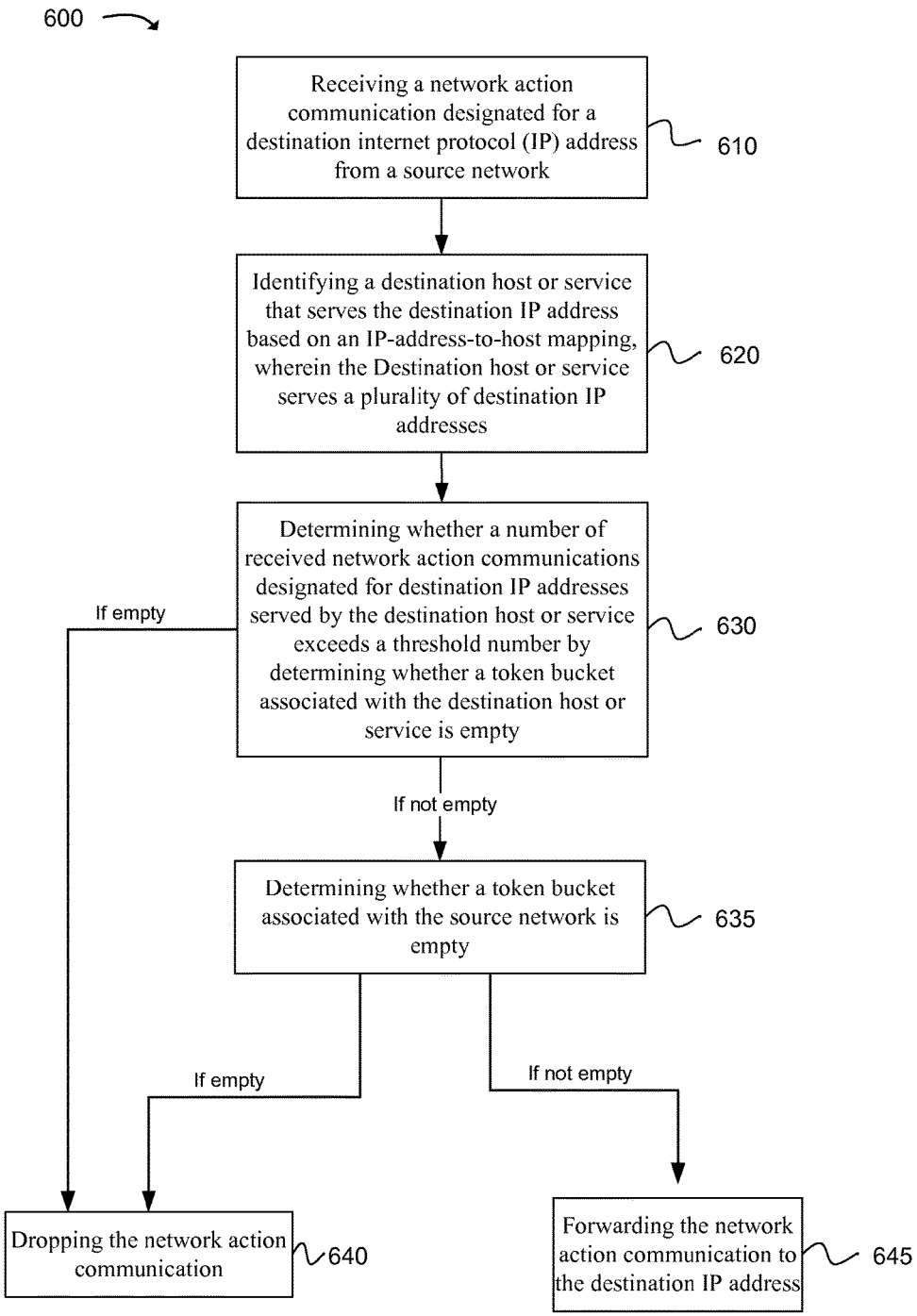
FIG. 6 is a flowchart of an example method for managing traffic to a hardware server having destination IP (internet protocols) addresses in a packet-switched network in accordance with an example.

FIG. 6 is a flowchart of an example method 600 for managing traffic to a destination host or service having destination IP (internet protocol) addresses in a network (e.g., a packet-switched network). As in block 610, one operation of the method may be receiving a network action communication designated for a destination internet protocol (IP) address from a source network. The network action communication may be, for example, a SYN packet or another type of packet.

As in block 620, another operation may be identifying a destination host or service that serves the destination IP address based on an IP-address-to-host mapping or a host mapping that maps destination IP addresses to the destination hosts or services, which host computing instances or other virtualized resources that are configured to use the destination IP addresses. The destination host or service may serve a plurality of destination IP addresses. In examples where the destination host or service is a hardware host, each destination IP address served by the destination host or service may be associated with a computing instance on the hardware host.

In some examples, a mapping agent at a load balancing host may be polled periodically by a mapping manager of a network traffic limiter for update information regarding an IP-address-to-host mapping or a hosting mapping. Update information may be received from the mapping agent and used to update the mapping accordingly at the network traffic limiter. In this manner, mappings can be kept up to date when a destination host or service serving an IP address is changed in a computing service environment (e.g., because one host or service is temporarily deactivated for maintenance).

As in block 630, another operation may be determining whether a number of received network action communications designated for destination IP addresses served by the destination host or service exceeds a threshold number. There may be a token bucket associated with the destination host or service that is allotted a predefined number of tokens for a time interval. Each time a network action communication designated for a destination IP address served by the destination host or service is received, a token may be removed from the token bucket associated with the destination host or service. Hence, an empty token bucket may indicate that the number of received network action communications exceeds the threshold number. A priority level of the network action communication designated for the destination IP address may be adjusted (e.g., deprioritized) based on a determination that the number of received network action communications designated for destination IP addresses served by the destination host or service exceeds the threshold number. Conversely, if a token bucket associated with the destination host or service does include at least one token, the network action communication may be forwarded to the destination IP address served by the destination host or service and a number of tokens in the token bucket may be decremented accordingly.

Alternatively, in some examples, information needed by a mapping manager to determine the destination host to which the destination IP maps may not be available. When this is the case, there may be a token bucket for the destination IP address rather than for the destination host or service, since the destination host or service serving the destination IP address is not indicated in an IP-address-to-host mapping or in a host mapping. If the token bucket for the destination IP address has no tokens, the network action communication may be dropped. If the token bucket for the destination IP address has at least one token, the network action communication may be forwarded to the destination IP address and a number of tokens in the token bucket may be decremented accordingly. A token bucket for a destination IP address may be used in a hybrid scheme that also has buckets for destination host or service; this may occur, for example, when only partial mappings from IP addresses to destination host or service are available.

A rate at which network action communications designated for the destination IP addresses served by the destination host or service are being received may also be calculated (e.g., by dividing a number of tokens removed from a bucket associated with the destination host or service during a time interval by the time interval). A suspicion score for traffic designated for the destination IP addresses served by the destination host or service may be adjusted based on the rate, and a priority level of the network action communication designated for the destination IP address may be adjusted based on the suspicion score.

As in block 635, there may also be a token bucket associated with the source network. The token bucket associated with the source network may be allotted a predefined number of tokens for a time interval. Each time a network action communication is received from the source network, the number of tokens in the token bucket associated with the source network may be decremented (i.e., one token may be removed).

As in block 640, another operation may be dropping the network action communication designated for the destination IP address when a threshold number is exceeded by the number of received network action communications. In examples where a token bucket associated with the destination host or service is used, the network action communication may be dropped once it is determined that the token bucket associated with the destination host or service does not contain any tokens. In examples where a token bucket associated with the source network is used, the network action communication may be dropped once it is determined that the bucket associated with the source network does not contain any tokens. In examples where a priority level of the network action communication designated for the destination IP address is adjusted, the network action communication may be dropped based on the priority level of the network action communication. However, if the priority level of the network action communication is sufficient, the network action communication may be forwarded to the destination IP address served by the destination host or service.

As in block 645, if a token bucket associated with the destination IP address and a token bucket associated with the source network are not empty, the network action communication may be forwarded to the destination IP address.

Figure 7:
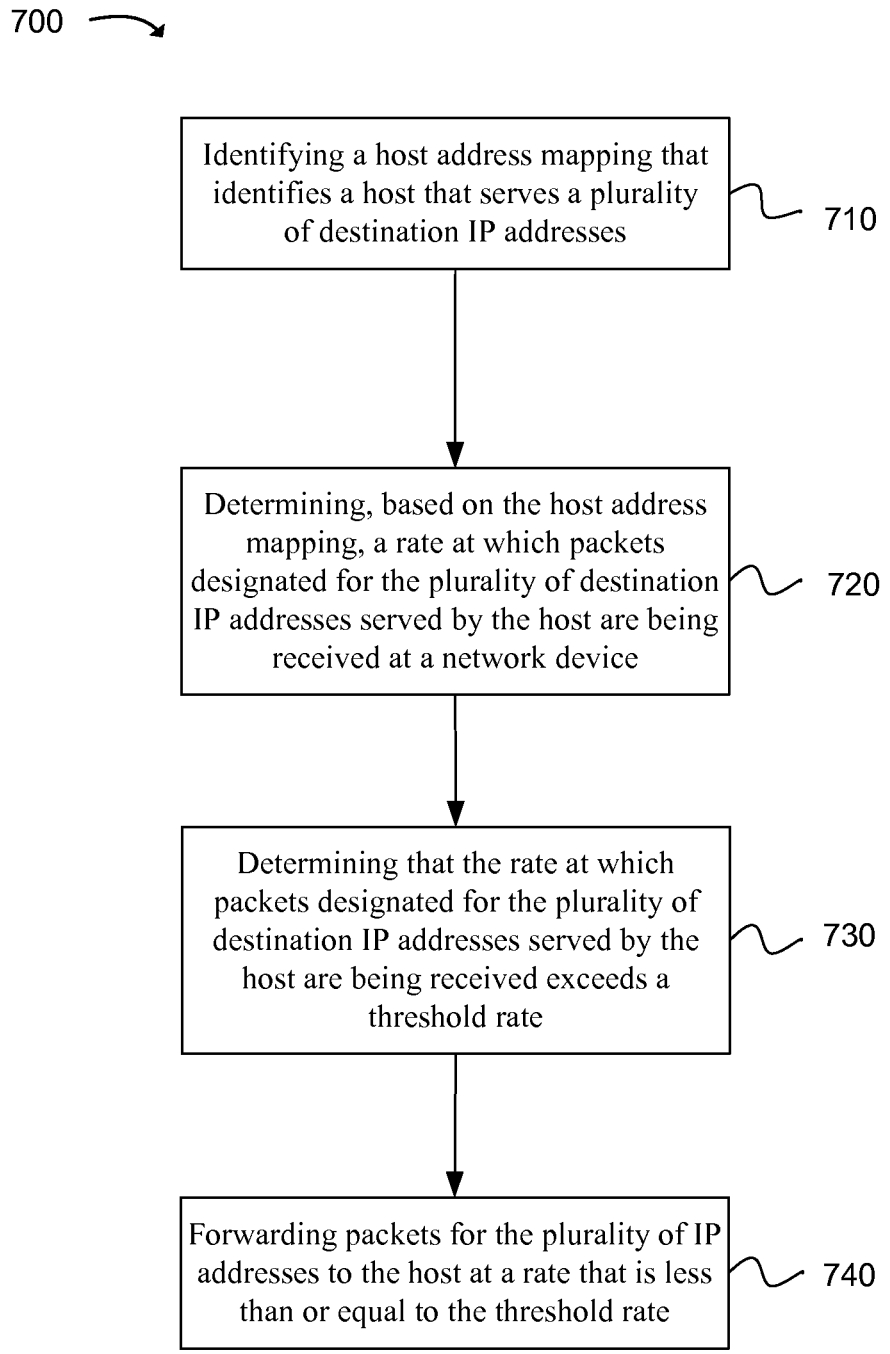
FIG. 7 is a flowchart of an example method for managing network traffic to a hardware server in accordance with an example.

FIG. 7 is a flowchart of an example method for managing network traffic to a destination host or service. As in block 710, one operation of the method 700 may be identifying a host address mapping that identifies a host that serves a plurality of destination IP addresses (e.g., for computing instances at the host). A mapping agent (e.g., at a load balancing host) may be polled periodically by a mapping manager of a network traffic limiter for update information regarding the host address mapping. Update information may be received from the mapping agent and used to update the host address mapping accordingly. In this manner, the host address mapping can be kept up to date when a destination IP address is changed and is being served by one host to being served by another host in a computing service environment.

As in block 720, another operation may be determining, based on the host address mapping, a rate at which packets designated for the plurality of destination IP addresses served by the host are being received at a network device. In some examples, a token bucket associated with the host and a plurality of destination IP addresses serviced by the host may be identified. A predefined number of tokens may be added to the token bucket at a regular time interval. If it is determined that the token bucket includes at least one token, a packet may be forwarded to a destination IP addresses served by the host. When a packet is forwarded, a number of tokens in the token bucket may be decremented. Conversely, if the token bucket is empty, packets designated for a destination IP addresses served by the host may be dropped in order to keep a rate of traffic flow to the host from exceeding a predefined rate. For example, if there are n tokens deposited in the bucket every j milliseconds, the rate of network traffic flow to the host may be constrained to be no greater than n packets (or other network action communications) per j milliseconds.

As in block 730, another operation may be determining that the rate at which packets designated for the plurality of destination IP addresses served by the host are being received exceeds a threshold rate. In examples using a token bucket for a host, the threshold rate may be considered to be exceeded when a packet designated for a destination IP address served by the host is received and there are no remaining tokens in the token bucket.

As in block 740, another operation of the method 700 may be forwarding packets for the plurality of IP addresses to the host at a rate that is less than or equal to the threshold rate. In examples where a token bucket for the host is used, this may be accomplished by (1) forwarding network action communications designated for destination IP addresses served by the host when there are more than zero tokens in the bucket and by (2) dropping network action communications designated for destination IP addresses served by the host when there are zero tokens in the token bucket.

Figure 8:
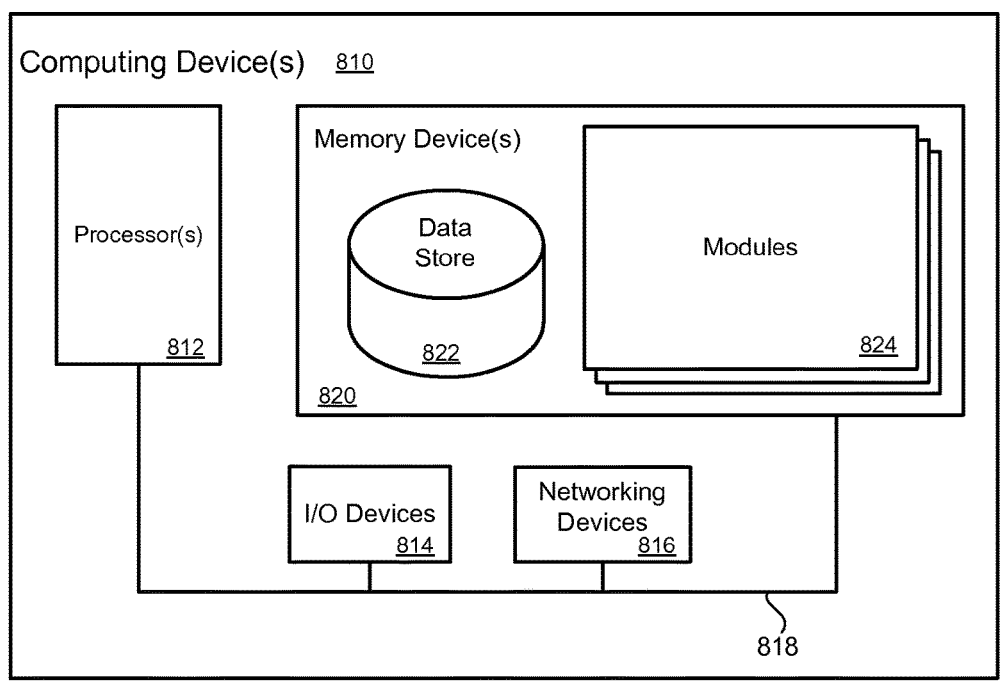
FIG. 8 is block diagram illustrating a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method comprising:
   identifying a mapping between a hardware server and a plurality of destination Internet Protocol (IP) addresses corresponding to a plurality of computing instances hosted by the hardware server;
   detecting, using a networking device, whether the hardware server is overloaded when a number of requests for packets to be sent to the plurality of destination IP addresses exceeds a defined threshold by detecting whether at least one token is associated with the hardware server; and
   dropping a network packet corresponding to at least one of the destination IP addresses in response to determining that at least one token is not associated with the hardware server.

2. The method of claim 1, further comprising:
   determining that the mapping does not map the destination IP address to the hardware server;
   associating the destination IP address to an individual token bucket; and
   determining that the token bucket associated with the destination IP address does not include a token, thereby indicating that a destination service or a destination host associated with the destination IP address may be overloaded.

3. The method of claim 1, further comprising:
   polling a mapping agent;
   receiving mapping update information from the mapping agent; and
   updating the mapping at a network traffic limiter in accordance with the mapping update information.

4. The method of claim 1, further comprising:
   deprioritizing the packet to be sent to the destination IP address on the hardware server based on the determination that the hardware server is overloaded; and
   dropping the packet based on the deprioritization.

5. A computer-implemented method comprising:
   receiving a network action communication designated for a destination address;
   identifying a destination service that serves a destination IP address based on a mapping, wherein the destination service serves a plurality of destination addresses;
   determining whether at least one token is associated with the destination service, wherein tokens in a token bucket associated with the destination service indicate a number of received network action communications designated for destination addresses served by the destination service and a lack of tokens indicates that a threshold number of the received network action communications is exceeded; and
   deprioritizing a network action communication designated for the destination address in response to determining that at least one token is not associated with the a server.

6. The method of claim 5, further comprising:
   adjusting a priority level of the network action communication designated for the destination address based on the determination that the number of received network action communications designated for destination addresses served by the destination service exceeds the threshold number.

7. The method of claim 5, further comprising:
   dropping the network action communication designated for the destination address based on the determination that the token bucket associated with the destination service does not include a token.

8. The method of claim 5, further comprising:
   forwarding the network action communication to the destination address; and
   decrementing a number of tokens in the token bucket associated with the destination service.

9. The method of claim 5, further comprising:
   determining that the destination address does not map to any destination service in a mapping table; and
   dropping the network action communication designated for the destination address based on the determination that the token bucket associated with the destination addresses does not include a token.

10. The method of claim 5, further comprising:
    polling a mapping agent;
    receiving, at a network traffic limiter, mapping update information from the mapping agent; and
    updating, at the network traffic limiter, the mapping in accordance with the mapping update information.

11. The method of claim 5, wherein the destination address is an address of a computing instance on the destination service.

12. The method of claim 6, further comprising:
    dropping the network action communication based on the priority level of the network action communication designated for the destination address.

13. The method of claim 6, further comprising:
    forwarding the network action communication to the destination address based on the priority level of the network action communication designated for the destination address.

14. The method of claim 6, further comprising:
calculating a rate at which network action communications designated for the destination addresses served by the destination service are being received;
adjusting a suspicion score for traffic designated for the destination addresses served by the destination service based on the rate; and
adjusting the priority level of the network action communication designated for the destination address based on the suspicion score.

15. A non-transitory computer-readable medium having instructions thereon which, when executed by one or more processors, perform the following:
identifying an address mapping that identifies a destination host that serves a plurality of destination addresses for computing instances;
determining, based on the address mapping, a rate at which packets designated for the plurality of destination addresses served by the destination host are being received at a network device;
determining whether at least one token is associated with the destination host, wherein a number of tokens in a token bucket is additively associated with the destination host at a regular tokenization rate;
determining that the rate at which packets designated for the plurality of destination addresses served by the destination host are being received exceeds the tokenization rate;
forwarding packets for the plurality of addresses to the destination host at a rate that is less than or equal to the tokenization rate; and
preventing one or more network packets corresponding to at least one of the destination addresses from being delivered to a corresponding one of the plurality of computing instances when at least one token is not associated with the destination host.

16. The non-transitory computer-readable medium of claim 15, further comprising instructions thereon which, when executed by one or more processors, perform the following:
forwarding a packet to a destination addresses served by the destination host; and
decrementing a number of tokens in the token bucket in order to control a rate of traffic flow to the destination host.

17. The non-transitory computer-readable medium of claim 15, further comprising instructions thereon which, when executed by one or more processors, perform the following:
dropping packets designated for a destination addresses served by the destination host based on the determination that the token bucket is empty.

18. The non-transitory computer-readable medium of claim 15, further comprising instructions thereon which, when executed by one or more processors, perform the following:
polling a mapping agent;
receiving, at a network traffic limiter, mapping update information from the mapping agent; and
updating, at the network traffic limiter, the destination host address mapping in accordance with the mapping update information.

\* \* \* \* \*